Nov. 23, 1926.
G. C. NAGLER ET AL
BANDAGE
Filed Feb. 9, 1920
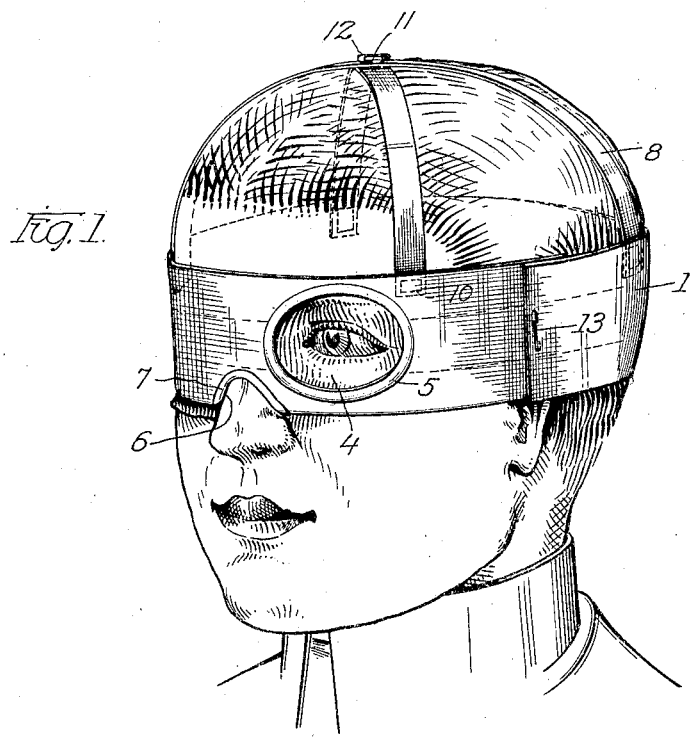
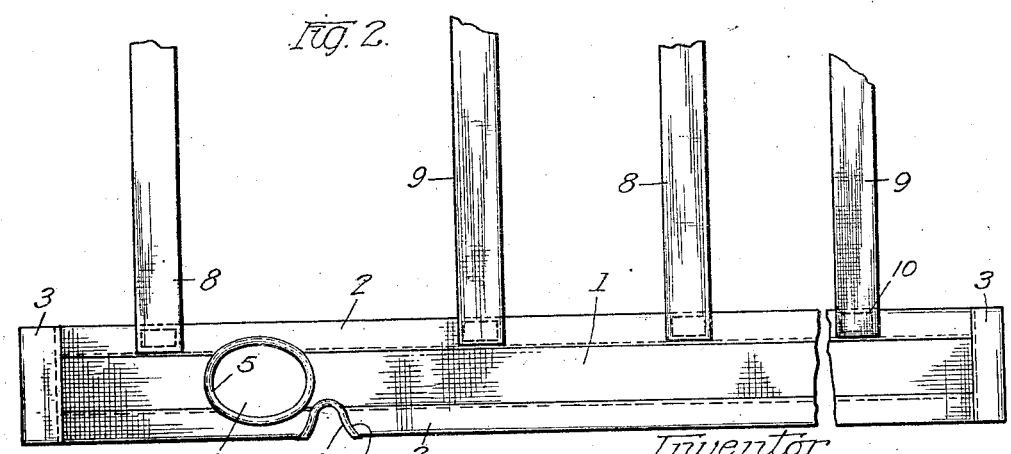

Patented Nov. 23, 1926.

1,607,717

UNITED STATES PATENT OFFICE.

GENEVIEVE C. NAGLER AND LOTTIE AMUNDSON, OF OSCEOLA, WISCONSIN.

BANDAGE.

Application filed February 9, 1920. Serial No. 357,325.

Our invention has reference more particularly to a bandage which is adapted to be applied over the eye, so as to leave the other eye unobstructed.

In case of injury to the eye or other cause requiring a covering to be applied thereto, it is customary to use a bandage consisting of a strip of material which is wrapped around the head or in some cases, an eye protector is employed, consisting of a pad or covering which is connected at the upper end to and depends downwardly from a cord or tape, the latter being passed around the head and fastened. In the case of the bandage, it is necessary to arrange same diagonally across the eye which is to be covered, in order to leave the other eye exposed and avoid obstructing the vision thereof, but in this position the bandage must pass partly over one side of the crown of the head and does not hold readily in place, but is disposed to slip off over the top of the head. The eye protector, mentioned, also is unsatisfactory as the protector is secured only at the top and is not held firmly in place over the eye, and consequently pads or other dressing which may be required for the injured eye are not held properly and securely in place.

The principal objects of our invention are to provide a bandage which may be wrapped or drawn straight across the eye to be covered and held securely in place on the head; to provide a bandage which is adapted to hold padding, or other dressing that may be required, securely in place; to provide an eye bandage which may be secured around the sides and back of the head where the surface of the head slopes downwardly and inwardly, thereby preventing displacement of the bandage upwardly, and having facilities to prevent displacement of the bandage downwardly; to provide a bandage for one eye having an opening for the other eye and if required, a notch for the bridge of the nose, so that the bandage may be arranged straight across the eyes and around the head in a neat, close-fitting and secure position; and in general, to provide an improved eye bandage which is simple and inexpensive and adapted to more satisfactorily remain in place and cover the eye and hold padding or dressing thereover than bandages heretofore provided for this purpose.

On the drawings, Fig. 1 is a view of a patient's head with the eye bandage applied thereto, and Fig. 2 a side view of the bandage stretched out full length, an intermediate portion thereof being broken away and the head straps severed to permit the full length view to be shown.

Referring to the drawings, the reference numeral 1 indicates a bandage which preferably has the edges turned in and hemmed or otherwise finished as indicated at 2, and the ends turned in and hemmed or finished as indicated at 3, this latter construction affording sufficient strength at the ends of the bandage for pinning or otherwise fastening the ends of the bandage together.

An eye opening 4 is provided in the bandage said opening being of sufficient size and preferably of oval shape to enable the patient to see readily therethrough and the opening has the edges hemmed or finished with a binding as shown at 5. A notch 6 may also be provided at the proper position adjacent the eye opening 4 for the bridge of the nose, this notch being also preferably hemmed or bound as at 7.

For holding the bandage in proper position around the head against displacement downwardly, a pair of straps 8 and 9 have the ends secured to the upper edge of the bandage as at 10, so that when the bandage is placed around the head as shown in Fig. 1, these straps intersect over the crown of the head, and they may be secured together at the point of intersection as indicated at 11. It is to be understood that the ends of the straps may be permanently secured to the bandage by stitching as shown, or detachably secured if desired by small safety pins or other fasteners, and the intersecting portions of the bandage may likewise be permanently secured together at the proper point by stitching or detachably secured together by a small safety pin 12 or other suitable fastener.

In using the bandage, it is placed around the head with the notch 6 over the bridge of the nose and the opening 4 over the unaffected eye, and when the bandage is so placed, the other eye is fully covered by a portion of the bandage, and padding or other dressing may be placed thereunder and held securely in place over the eye which requires protection. The bandage is passed around the head and the ends fastened together with safety pins 13 or other suitable fasteners, with the straps 8 and 9 laid over the top of the head, in which position the bandage engages around the back of the head slightly below the center of the posterior bulge of the head.

Owing to the curvature of the crown of the head, an eye bandage cannot be bound over or along the crown of the head so that it will be retained securely in place. However, at the back and partly around at the side of the head the surface of the head slopes or curves downwardly and inwardly, forming the under portion of the posterior bulge of the head, this inward slope or curve in the normal cranium extending down substantially from what is known as Hamy's horizontal plane which is a nearly horizontal plane extending from the glabella to the lambda, the latter being the juncture of the occipital bone and the two parietal bones and located approximately at the rearmost extremity of the posterior bulge of the head. A bandage, therefore, passed across the eye recesses is substantially held thereby against upward displacement at the front of the head, and if drawn around against the back of the head substantially below said Hamy's horizontal plane or against the inwardly and downwardly sloping surface of the head, it will be held against displacement upwardly at the back of the head. The straps 8 and 9 are long enough to permit such location of the bandage as shown in Fig. 1, and being laid over the crown of the head, prevent downward displacement of the bandage, thus holding the bandage securely in a fixed position.

A bandage constructed in accordance with this invention is capable of use in connection with either a right or a left affected eye without structural change or modification. More specifically, the bandage and head engaging means may be conveniently reversed so that the sight opening will register with the unaffected eye when the bandage is applied. This feature makes it unnecessary for dealers and those who have use for bandages of the kind illustrated to carry separate right and left bandages.

The eye opening which we have provided is an important feature, as it permits the bandage to be placed in the foregoing described position without obstructing the vision of the unaffected eye, and without this opening or some similar provision, the bandage would need be placed diagonally or in some other manner so that the secure arrangement which we have afforded could not be accomplished.

While we have shown and described our invention in a certain prescribed form, we are aware that various changes and modifications may be made therein without departing from the principles of our invention, and we therefore do not purpose limiting the patent granted hereon, otherwise than necessitated by the prior art.

We claim as our invention:

A surgical bandage for use in bandaging either a right or left eye comprising a narrow strip of uniform width throughout adapted to entirely encircle the head, the ends of the strip being adapted to be secured together, said strip having a closed portion to extend over an affected right or left eye, said strip having a sight opening adjacent one end of the strip for registration with the unaffected eye, diagonally disposed head-engaging means adapted to extend across the top of the head and having its ends secured to the strip for securing the strip in place and against dropping, and a notched portion adapted to receive the nose of the wearer, said strip and said head engaging means being reversible whereby the same bandage may be used in covering either a right or left affected eye, leaving the vision of the unaffected eye unobstructed.

LOTTIE AMUNDSON.
GENEVIEVE C. NAGLER.